(12) United States Patent
Chu et al.

(10) Patent No.: US 6,801,384 B2
(45) Date of Patent: Oct. 5, 2004

(54) VOLTAGE-CONSTRAINED SINUSOIDAL SEEK SERVO IN HARD DISK DRIVES

(75) Inventors: Sang Hoon Chu, Santa Clara, CA (US); Jun Seok Shim, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 342 days.

(21) Appl. No.: 09/861,316

(22) Filed: Aug. 22, 2001

(65) Prior Publication Data

US 2002/0048113 A1 Apr. 25, 2002

Related U.S. Application Data

(60) Provisional application No. 60/232,961, filed on Sep. 14, 2000.

(51) Int. Cl.[7] .............................................. G11B 5/596
(52) U.S. Cl. ............................. 360/78.07; 360/78.06; 360/75
(58) Field of Search ....................... 360/75, 78.06, 360/78.07, 77.01, 78.01, 78.04, 78.05

(56) References Cited

U.S. PATENT DOCUMENTS

| | | |
|---|---|---|
| 4,371,902 A | 2/1983 | Baxter et al. |
| 4,539,662 A | 9/1985 | Hatano et al. |
| 4,616,276 A | 10/1986 | Workman |
| 4,677,568 A | 6/1987 | Arbter |
| 4,802,033 A | 1/1989 | Chi |
| 4,811,135 A | 3/1989 | Janz |
| 4,823,212 A | 4/1989 | Knowles et al. |
| 4,890,172 A | 12/1989 | Watt et al. |
| 4,937,689 A | 6/1990 | Seaver et al. |
| 4,977,472 A | 12/1990 | Volz et al. |
| 4,979,056 A | 12/1990 | Squires et al. |
| 4,982,295 A | 1/1991 | Yakuwa et al. |
| 5,036,408 A | 7/1991 | Leis et al. |

(List continued on next page.)

FOREIGN PATENT DOCUMENTS

| | | |
|---|---|---|
| EP | 0263962 A2 | 4/1988 |
| EP | 0441407 A1 | 8/1991 |
| EP | 0543654 A2 | 5/1993 |
| EP | 0 601 855 A2 | 6/1994 |
| EP | 0 663 766 A1 | 7/1995 |
| EP | 0 717 559 A2 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| GB | 2342492 A | 4/2000 |
| JP | 10208418 | 8/1998 |
| WO | WO-93/09480 A1 | 5/1993 |
| WO | WO 95/24035 | 9/1995 |
| WO | WO 96/23305 | 8/1996 |

*Primary Examiner*—David Hudspeth
*Assistant Examiner*—Jason Olson
(74) *Attorney, Agent, or Firm*—Irell & Manella LLP; Jeffrey P. Aiello

(57) ABSTRACT

A method, apparatus and computer program for performing a servo seek according to a voltage-constrained sinusoidal acceleration trajectory. In one embodiment, the apparatus comprises a hard disk drive which has a disk with a surface, spin motor, transducer, and an actuator arm to move a transducer across the surface of the disk. The apparatus further includes a controller that controls the actuator arm and to perform a seek having a length. The actuator arm moves the transducer across the surface of the disk with an essentially sinusoidal acceleration trajectory using a substantially constant voltage. In another embodiment, the substantially constant voltage is based on the maximum voltage from a power supply.

31 Claims, 7 Drawing Sheets

U.S. PATENT DOCUMENTS

| | | |
|---|---|---|
| 5,050,146 A | 9/1991 | Richgels et al. |
| 5,053,899 A | 10/1991 | Okawa et al. |
| 5,182,684 A | 1/1993 | Thomas et al. |
| 5,210,662 A | 5/1993 | Nishijima |
| 5,235,478 A | 8/1993 | Hoshimi et al. |
| 5,255,136 A | 10/1993 | Machado et al. |
| 5,291,110 A | 3/1994 | Andrews, Jr. et al. |
| 5,333,140 A | 7/1994 | Moraru et al. |
| 5,408,367 A | 4/1995 | Emo |
| 5,448,429 A | 9/1995 | Cribbs et al. |
| 5,450,249 A | 9/1995 | Nagaraj et al. |
| 5,452,285 A | 9/1995 | Monen |
| 5,453,887 A | 9/1995 | Negishi et al. |
| 5,465,034 A | 11/1995 | Andrews, Jr. et al. |
| 5,465,035 A | 11/1995 | Scaramuzzo, Jr. et al. |
| 5,475,545 A | 12/1995 | Hampshire et al. |
| 5,500,776 A | 3/1996 | Smith |
| 5,523,902 A | 6/1996 | Pederson |
| 5,570,247 A | 10/1996 | Brown et al. |
| 5,581,420 A | 12/1996 | Chainer et al. |
| 5,583,712 A | 12/1996 | Brunelle |
| 5,587,850 A | 12/1996 | Ton-that |
| 5,600,506 A | 2/1997 | Baum et al. |
| 5,606,469 A | 2/1997 | Kosugi et al. |
| 5,608,587 A | 3/1997 | Smith |
| 5,615,058 A | 3/1997 | Chainer et al. |
| 5,631,783 A | 5/1997 | Park |
| 5,640,423 A | 6/1997 | Archer |
| 5,657,179 A | 8/1997 | McKenzie |
| 5,659,436 A | 8/1997 | Yarmchuk et al. |
| 5,666,238 A | 9/1997 | Igari et al. |
| 5,666,242 A | 9/1997 | Edwards et al. |
| 5,677,609 A | 10/1997 | Khan et al. |
| 5,680,270 A | 10/1997 | Nakamura |
| 5,680,451 A | 10/1997 | Betts et al. |
| 5,691,857 A | 11/1997 | Fitzpatrick et al. |
| 5,696,647 A | 12/1997 | Phan et al. |
| 5,710,677 A | 1/1998 | Teng et al. |
| 5,715,105 A | 2/1998 | Katayama et al. |
| 5,734,680 A | 3/1998 | Moore et al. |
| 5,748,677 A | 5/1998 | Kumar |
| 5,751,513 A | 5/1998 | Phan et al. |
| 5,760,992 A | 6/1998 | Phan et al. |
| 5,771,126 A | 6/1998 | Choi |
| 5,771,130 A | 6/1998 | Baker |
| 5,771,131 A | 6/1998 | Pirzadeh |
| 5,796,543 A | 8/1998 | Ton-That |
| 5,798,883 A | 8/1998 | Kim |
| 5,867,337 A | 2/1999 | Shimomura |
| 5,867,353 A | 2/1999 | Valent |
| 5,892,634 A | 4/1999 | Ito et al. |
| 5,901,009 A | 5/1999 | Sri-Jayantha et al. |
| 5,914,830 A * | 6/1999 | Kadlec et al. ........... 360/78.14 |
| 5,917,670 A | 6/1999 | Scaramuzzo et al. |
| 5,930,067 A | 7/1999 | Andrews et al. |
| 5,946,157 A | 8/1999 | Codilian et al. |
| 5,946,158 A | 8/1999 | Nazarian et al. |
| 5,949,605 A | 9/1999 | Lee et al. |
| 5,959,952 A | 9/1999 | Wakuda |
| 6,031,684 A | 2/2000 | Gregg |
| 6,118,616 A | 9/2000 | Jeong |
| 6,140,791 A | 10/2000 | Zhang |
| 6,169,382 B1 * | 1/2001 | McKenzie et al. .......... 318/561 |
| 6,178,060 B1 | 1/2001 | Liu |
| 6,225,767 B1 | 5/2001 | Lovett |
| 6,369,974 B1 | 4/2002 | Asgari et al. |
| 6,441,988 B2 * | 8/2002 | Kang et al. ............... 360/78.06 |
| 6,501,613 B1 * | 12/2002 | Shih ........................ 360/78.06 |
| 6,549,364 B1 * | 4/2003 | Shih ........................ 360/78.06 |
| 6,563,666 B1 * | 5/2003 | LaPanse .................. 360/78.09 |

\* cited by examiner

VOLTAGE-CONSTRAINED SINUSOIDAL SEEK SERVO IN HARD DISK DRIVES

REFERENCE TO CROSS-RELATED APPLICATIONS

This application claims priority to provisional application No. 60/232,961 filed on Sep. 14, 2000.

BACKGROUND OF THE INVENTION

1. Field of the Invention

The present invention relates generally to hard disk drive seeking and, more particularly, to a method, apparatus and computer program for improving the seek performance of a sinusoidal seek servo.

2. Description of the Related Art

Hard disk drives include a plurality of magnetic transducers that can write and read information by magnetizing and sensing the magnetic field of rotating disks. The information is typically formatted into a plurality of sectors that are located within annular tracks, which are located across the surface of the disk. A number of vertically similar tracks are often referred to as a cylinder. Each track may therefore be identified by a cylinder number.

Each transducer is typically integrated into a slider that is incorporated into a head gimbal assembly (hereinafter "HGA"). Each HGA is attached to an actuator arm. The actuator arm has a voice coil located adjacent to a magnet assembly which together define a voice coil motor. The hard disk drive typically includes a driver circuit and a controller that provide current to excite the voice coil motor. The excited voice coil motor rotates the actuator arm and moves the transducers across the surfaces of the disk(s).

When writing or reading information, the hard disk drive may perform a seek routine to move transducers from one cylinder (or track) to another cylinder. During the seek routine the voice coil motor is excited with a current to move the transducers to the new cylinder location on the disk surfaces. The controller also performs a servo routine to insure that the transducer moves to the correct cylinder location.

Many disk drives utilize a "bang-bang" control loop for the servo routine to insure that the transducer is moved to the correct location. The shape of the current waveform for seek routines that utilize bang-bang control theory is typically square. Unfortunately, square waveforms contain high frequency harmonics which stimulate mechanical resonance in the HGA causing acoustic noise. This acoustic noise tends to increase settling time. Thus, while the bang-bang control method may provide the best theoretical seek performance, the accompanying settling characteristics result in a less than optimal overall seek time.

The recent use of sinusoidal waveform algorithms for seek trajectories was aimed at improving the settling time by decreasing the acoustic noise exhibited by the bang-bang control method. In particular, seek trajectories based on sinusoidal algorithms exhibit superior acoustic noise properties, thereby reducing the settling time. However, sinusoidal waveforms for seek trajectories do exhibit some degradation in seek performance for shorter seek lengths as compared to the bang-bang control method. While, the overall degradation of seek performance for sinusoidal seek algorithms is somewhat compensated by the decreased acoustic noise of a sinusoidal seek trajectory, there is still a performance gap between sinusoidal seek trajectories and bang-bang seek trajectories for shorter seek lengths.

Thus, there is a need for a method, apparatus and computer program which further reduces the performance gap between the sinusoidal seek algorithm and the bang-bang seen algorithm, while not sacrificing the improved settling characteristics of the sinusoidal seek algorithm.

BRIEF SUMMARY OF THE INVENTION

The present invention comprises a method, apparatus and computer program for performing a servo seek according to a voltage-constrained sinusoidal acceleration trajectory. In one embodiment, the method comprises exciting a voice coil motor that is coupled to the transducer so that the transducer performs a seek having a seek length and a seek time, said transducer to move across the disk surface with an essentially sinusoidal acceleration trajectory. In addition, the seek is to be performed using a substantially constant voltage applied to the voice coil motor over one or more seek lengths. In another embodiment, the substantially constant voltage applied to the voice coil motor is in range of between 10 and 12 volts.

Other embodiments are described and claimed herein.

DETAILED DESCRIPTION OF THE PREFERRED EMBODIMENTS

Figure 1:
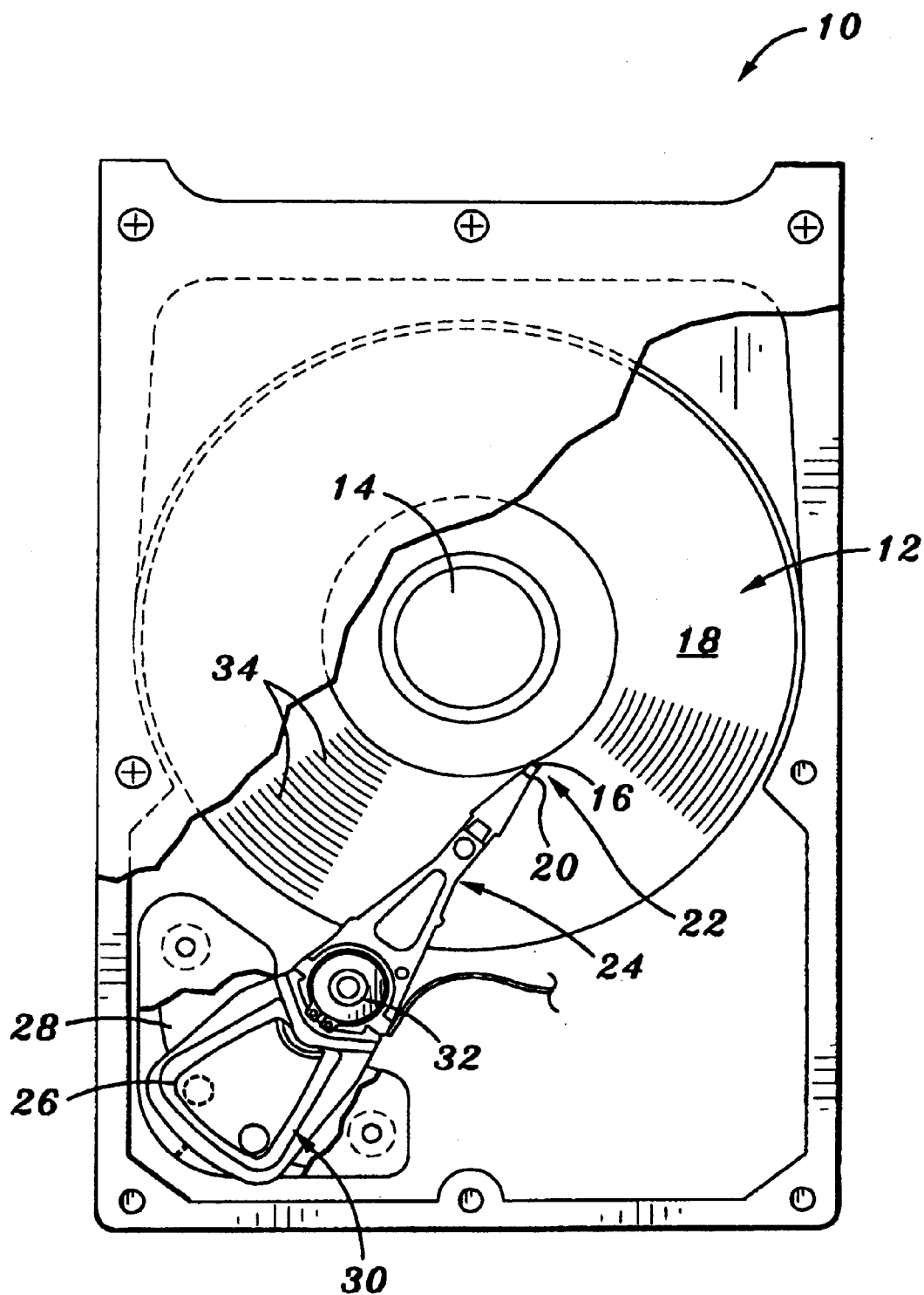
FIG. 1 is a top view of an embodiment of a hard disk drive of the present invention.

One embodiment of the present invention is a hard disk drive which moves a transducer across a disk surface in an essentially sinusoidal acceleration trajectory which is constrained by a substantially constant voltage. In particular, the seek time for a given seek length in a hard disk drive is based on the voltage constraint of the power supply to the voice coil motor rather than a constrained current. Once this seek time is determined, the sinusoidal trajectory may then be calculated.

A transducer is integrated into a slider that is incorporated into a head gimbal assembly (HGA). The HGA may be mounted to an actuator arm which can move the transducer across the disk surface. The movement of the actuator arm and the transducer is controlled by a controller. The controller moves the transducer from a present track to a new track in accordance with a seek routine and a servo control routine.

During the seek routine, the controller moves the transducer in accordance with an essentially sinusoidal acceleration seek trajectory. The acceleration trajectory includes at least an acceleration mode and a deceleration mode, and may further include a coast mode in which the acceleration is essentially zero. In one embodiment, the duration of acceleration mode and deceleration mode are equal. This sinusoidal trajectory serves to reduce the high harmonics found in square waveforms of the prior art, and minimize the mechanical resonance and thus the acoustic noise of the HGA. Reducing the acoustic noise of the HGA may reduce the settling time of the transducer for reducing the duration of the seek routine. Reducing the acoustic noise may also provide accurate positioning of the transducer relative to a desired track of the disk. In another embodiment, the duration of acceleration mode and deceleration mode are unequal which may provide flexibility in further decreasing residual vibrations of mechanical components, and reducing the seek time.

Typically, for a given current, longer seek lengths require larger voltages due to the effects of back-EMF. In particular, as seek lengths increase, so does the velocity of the transducer. As velocity increases, so too does the voltage-diminishing effects of back-EMF. Thus, the effective voltage decreases as back-EMF increases. This relationship can be depicted as follows:

$$V_{applied} = V_{supplied} - C*v$$

where, $V_{applied}$=the effective voltage applied to the actuator arm;

$V_{supplied}$=the voltage being supplied by the power supply;

C=proportionality constant;

v=velocity of the transducer; and

C*v=voltage which opposes the flow of current, thus acting as a negative voltage One way to counter the effects of back-EMF in a current-constrained system such as the one described in co-pending U.S. application, Ser. No. 09/167,884, entitled "Method And Apparatus For Reducing Acoustic Noise In A Hard Disk Drive," and which is hereby incorporated by reference, is to base the maximum current ($I_M$) on the voltage required for the maximum seek length at the point where the back-EMF is maximized. This value of current ($I_M$) is then used for each seek routine, regardless of its length. However, as explained in more detail below, under this approach $I_M$ is likely to be too conservative for most seek lengths which are less than the maximum seek length; thus, resulting in a poorer seek performance than could otherwise be obtained.

Thus, one aspect of the present invention is to vary the current while keeping the voltage substantially constant, thereby improving the seek performance for most seek lengths under the same power supply. In one embodiment, the voltage is set at the maximum value for the available power supply, while the current varies with the seek length.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material.

The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
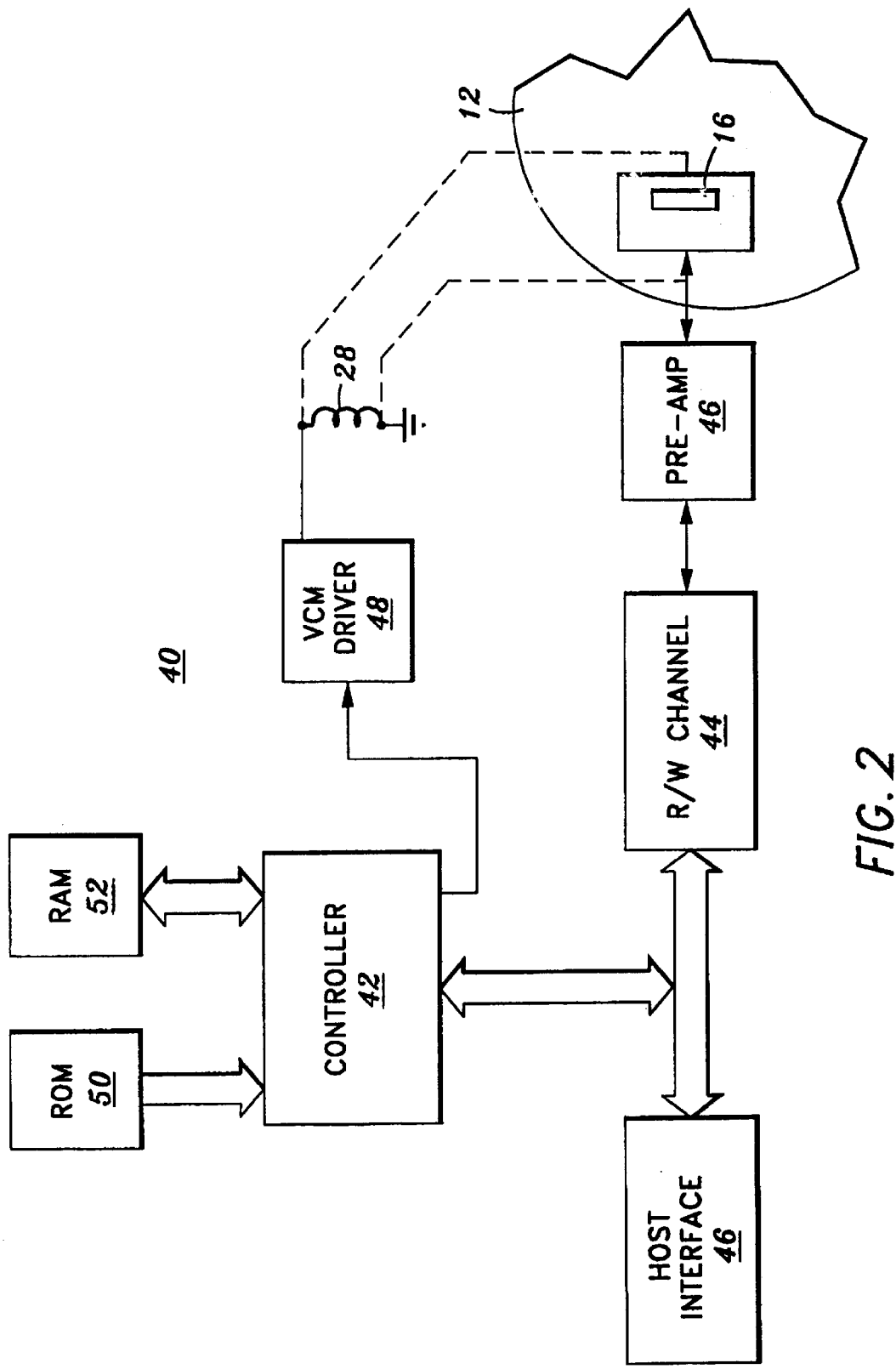
FIG. 2 is a schematic of an electrical system which controls the hard disk drive.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track. In one embodiment, the memory device 50 contains the acceleration, velocity, and position trajectory equations of the present invention, as discussed below, where such equations may be loaded into memory device 52 at startup.

Figure 3:
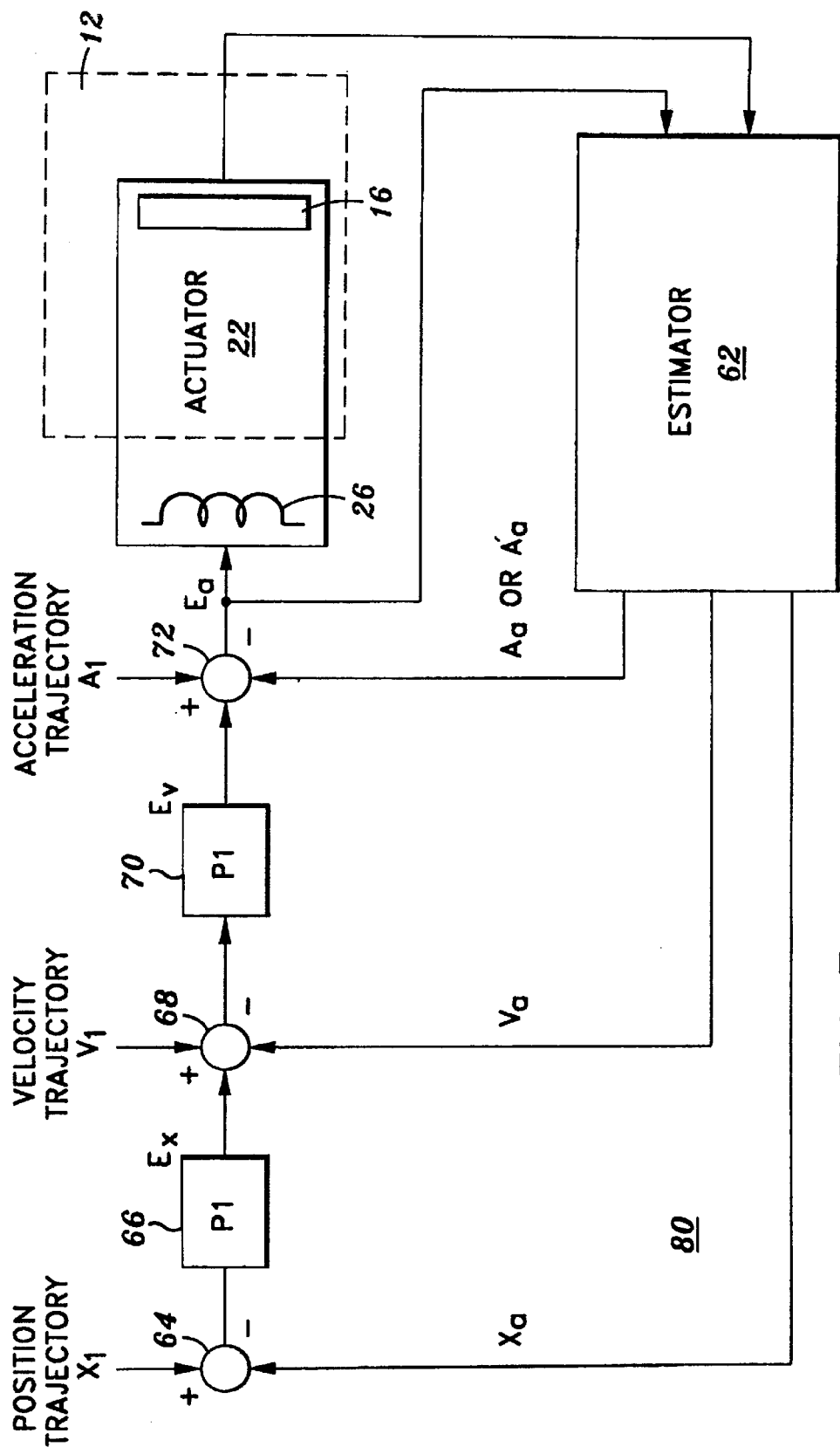
FIG. 3 is a schematic of a servo control system of the disk drive.

FIG. 3 shows a servo control system 60 that is implemented by the controller 42, which may be implemented in hardware and/or software. The servo control system 60 insures that the transducer 16 is accurately located on a desired track of the disk 12. When the controller 42 performs a seek routine the transducer 16 is moved from a first track to a new track located a distance $X_{SK}$ from the first track. The Gray codes of one or more tracks located between the new and first tracks are read as the transducer 16 moves across the disk 16. This allows the controller 42 to periodically determine whether the transducer 16 is moving at a desired speed or acceleration, or both, across the disk surface.

The control system 60 includes an estimator 62, which may be implemented in software and/or hardware. The estimator 62 can determine the actual distance or position $X_a$ that the transducer has moved from the first track. The position can be determined by reading the Gray code of a track beneath the transducer 16. The estimator 62 can also determine the actual velocity $V_a$ and actual acceleration $A_a$ of the transducer 16. The Gray codes can be periodically sampled as the transducer 16 moves to the new track location so that the controller 42 can correct the movement of the transducer 16 with the control 60.

The controller 42 computes a design position $X_i$, a design velocity $V_i$ and a design acceleration $A_i$ of the transducer 16 each time the transducer reads the Gray code of a track 34. The controller 42 computes the difference between the design position $X_i$ and the actual position $X_a$ at summing junction 64. In block 66 the controller 42 then computes a position correction value $E_x$ with a proportional plus integral control algorithm and the output of the summing junction 64.

The actual velocity $V_a$ is subtracted from the sum of the design velocity $V_i$ and the position correction value $E_x$ at summing junction 68. In block 70 the controller 42 computes a velocity correction value $E_v$ with a proportional plus integral control algorithm and the output of the summing junction 68.

An acceleration correction value $E_a$ is computed by subtracting the actual acceleration $A_a$ from the sum of the design acceleration $A_i$ and the velocity correction value $E_v$ at summing junction 72. The acceleration correction value $E_a$ is used to increase or decrease the current provided to the voice coil 26 and to vary the acceleration of the movement of the transducer 16.

The acceleration correction value $E_a$ may also be provided to the estimator 62 to generate a feedforward acceleration value $A'_a$. The feedforward acceleration value $A'_a$ can be provided to summing junction 72 to provide a feedforward control loop.

Figure 4A:
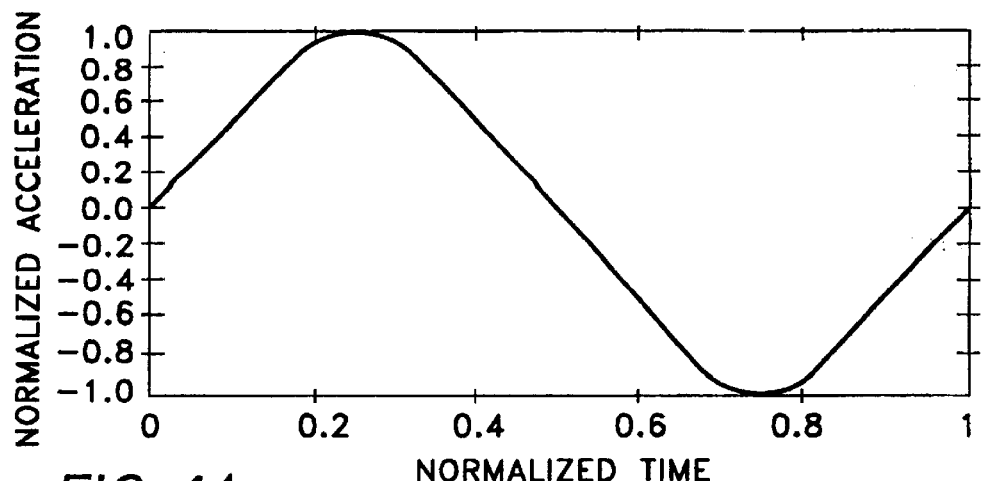
FIGS. 4a–c are graphs which show an acceleration trajectory, a velocity trajectory, and a position trajectory of a transducer of the disk drive of the present invention.
Figure 4B:
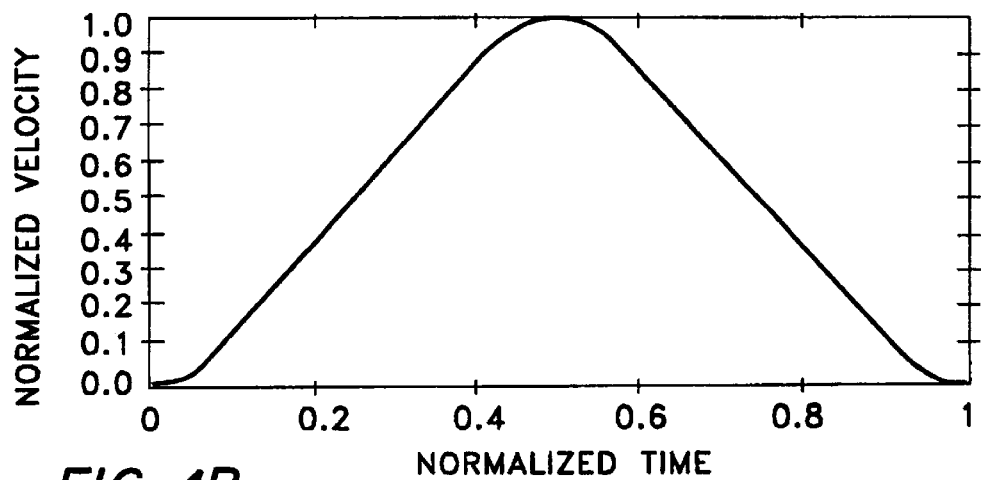
Figure 4C:
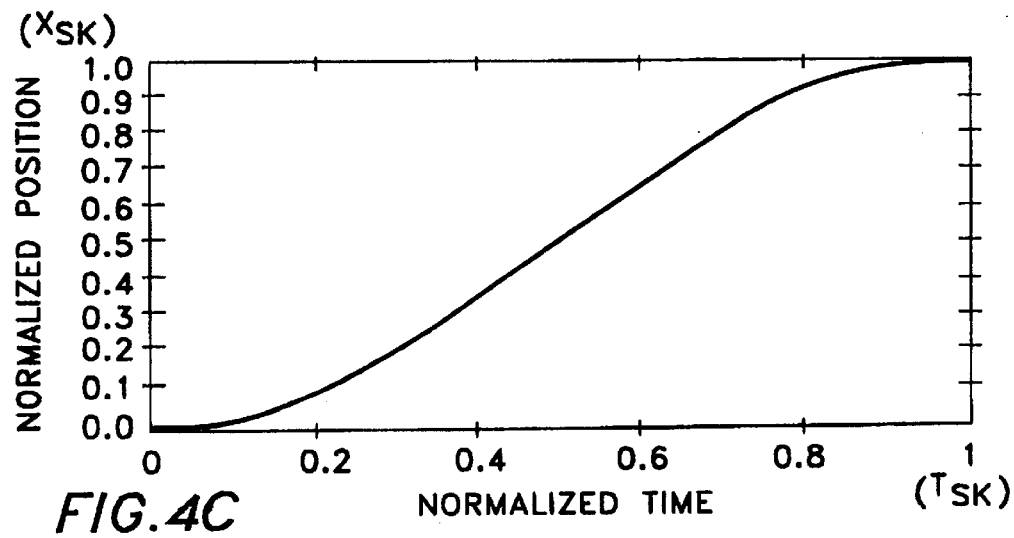

The design acceleration, velocity, and position waveforms provided at summing junction 72, 68, and 64, respectively, correspond to the sinusoidal waveforms in FIGS. 4a–c.

Sinusoidal acceleration trajectories have been based on a seek sinusoidal wave algorithm in the following form:

$$a(t) = K_A I_M \sin\left(\frac{2\pi}{T_{SK}}t\right) \tag{1}$$

where, $K_A$ = acceleration constant;

$I_M$ = maximum current; and $T_{SK}$ = seek time required to move the transducer from one track to another track.

The velocity trajectory equation and the position trajectory equation have been derived by respectively integrating the acceleration trajectory equation (1) and the velocity trajectory equation (2), yielding:

$$v(t) = K_A I_M \frac{T_{SK}}{2\pi}\left[1 - \cos\left(\frac{2\pi}{T_{SK}}t\right)\right] \tag{2}$$

and, $$x(t) = K_A I_M \frac{T_{SK}}{2\pi}\left[t - \frac{T_{SK}}{2\pi}\sin\left(\frac{2\pi}{T_{SK}}t\right)\right]. \tag{3}$$

For a given seek length ($X_{SK}$), the time (t) is equal to the seek time ($T_{SK}$), yielding the following relationship:

$$X_{SK} = x(T_{SK}) = K_A I_M \frac{T_{SK}^2}{2\pi} \tag{4}$$

From equation (4), we have then been able to solve for the required seek time ($T_{SK}$) for a given seek length ($X_{ST}$) using:

$$T_{SK} = \sqrt{\frac{2\pi X_{SK}}{K_A I_M}} \tag{5}$$

Equation (5) highlights the fact that, as mentioned previously, the technique of the co-pending application of calculating seek trajectories of sinusoidal wave forms has been constrained by the substantially constant current ($I_M$) supplied to the VCM. However, this ignores the fact that the actual physical limitation imposed on the transducer is the voltage power supply. Ignoring this fact leads to sub-optimal seek performance for most seek lengths below the maximum seek length.

One aspect of the present invention seeks to overcome this deficiency by utilizing the voltage limitations of the power supply as a limiting factor for transducer movement. That is, with the voltage constrained technique of the present invention, the relationship between $X_{SK}$ and $T_{SK}$ is determined independently of the value of $I_M$ since $I_M$ varies with seek length. Accordingly, a voltage-constrained relationship between seek time ($T_{SK}$) and seek length ($X_{SK}$), according to one embodiment of the present invention, is described hereafter.

VCM voltage can be represented in the following form:

$$V = L\frac{di}{dt} + R*i + K_e*v \tag{6}$$

where,

L = VCM inductance;

$K_e$ = back-EMF constant;

R = VCM resistance; and, v = VCM velocity.

Next, the VCM current can be represented as follows:

$$i(t) = I_M \sin\left(\frac{2\pi}{T_{SK}}t\right) \tag{7}$$

Differentiating (7) gives, $$\frac{d}{dt}i(t) = I_M \frac{2\pi}{T_{SK}}\cos\left(\frac{2\pi}{T_{SK}}t\right) \tag{8}$$

Substituting (7) and (8) into (6), yields:

$$V(t) = K_e K_A I_M \frac{T_{SK}}{2\pi} + \tag{9}$$

$$RI_M \sin\left(\frac{2\pi}{T_{SK}}t\right) + \left[LI_M 2\frac{\pi}{T_{SK}} - K_e K_A I_M \frac{T_{SK}}{2\pi}\right]\cos\left(\frac{2\pi}{T_{SK}}t\right)$$

In this form, voltage is a periodic function of time, having a period of $T_{SK}$. Equation (9) is then set to $V_{max}$, where $V_{max}$ is the voltage constraint imposed by the power supply. In one embodiment, this maximum voltage is 12 volts. Since maximizing the value of "a sin(x)+b cos(x)" over one period yields "$\sqrt{a^2+b^2}$", equation (9) reduces to:

$$V_{\max} = K_e K_A I_M \frac{T_{SK}}{2\pi} + \sqrt{(RI_M)^2 + \left(LI_M \frac{2\pi}{T_{SK}} - K_e K_A I_M \frac{T_{SK}}{2\pi}\right)^2} \quad (10)$$

Finally, substituting (5) into (10) yields, $$K_e \frac{X_{SK}}{T_{SK}} + \sqrt{\left(\frac{2\pi R X_{SK}}{K_A T_{SK}}\right)^2 + \left(\frac{4\pi^2 L X_{SK}}{K_A T_{SK}^2} - \frac{K_e X_{SK}}{T_{SK}}\right)^2} - V_{\max} = 0. \quad (11)$$

In this form, equation (11) yields the voltage-constrained relationship between seek length ($X_{SK}$) and seek time ($T_{SK}$) with all other variables (e.g., $K_e$, R, $K_A$, $V_{max}$) being constant and independent of $I_M$. According to one embodiment, the values of $T_{SK}$ versus $X_{SK}$ may then be stored in a lookup table for future use.

Rather than perform a square root operation, the controller can compute $T_{SK}$ from $X_{SK}$ by generating a number of sample points N between t=0 and t=$T_{SK}$ and, using the following linear interpolation algorithm, determine the seek time between sample point:

$$SK = T_{SK}^i + \frac{T_{SK}^{i+1} - T_{SK}^i}{X_{SK}^{i+1} - X_{SK}^i}(X_{SK} - X_{SK}^i) \quad (12)$$

where $T_{SK}^i$ and $X_{SK}^i$ indicate the ith sampled seek time and seek length, respectively.

According to one embodiment, the value of $T_{SK}$ given by equation (11) or (12) is substituted into the amplitude terms of equations (1), (2) and (3) to generate the acceleration, velocity and position trajectories, respectively. Morever, given $T_{SK}$, equation (5) may be substituted into each of equations (1), (2) and (3). Thereafter, equations (1), (2) and (3) are used to generate acceleration, velocity and position trajectories, respectively. Thus, one aspect of the current invention, unlike previous sinusoidal seek trajectories, is that the current ($I_M$) varies, while the voltage remains substantially constant.

Figure 5:
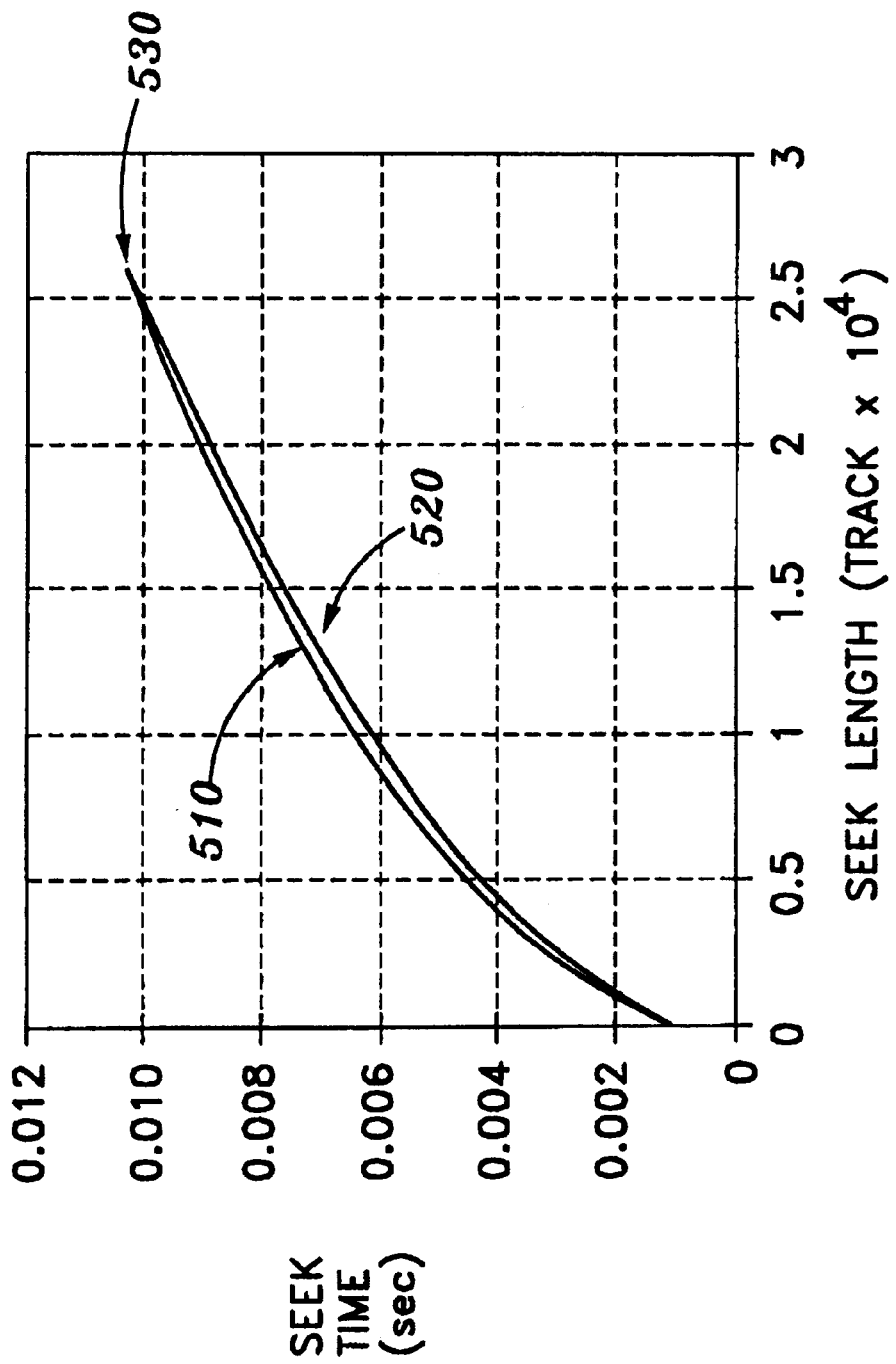
FIG. 5 is a graph comparing a plot of seek time versus seek length for a current-constrained seek and a voltage-constrained seek.
Figure 6:
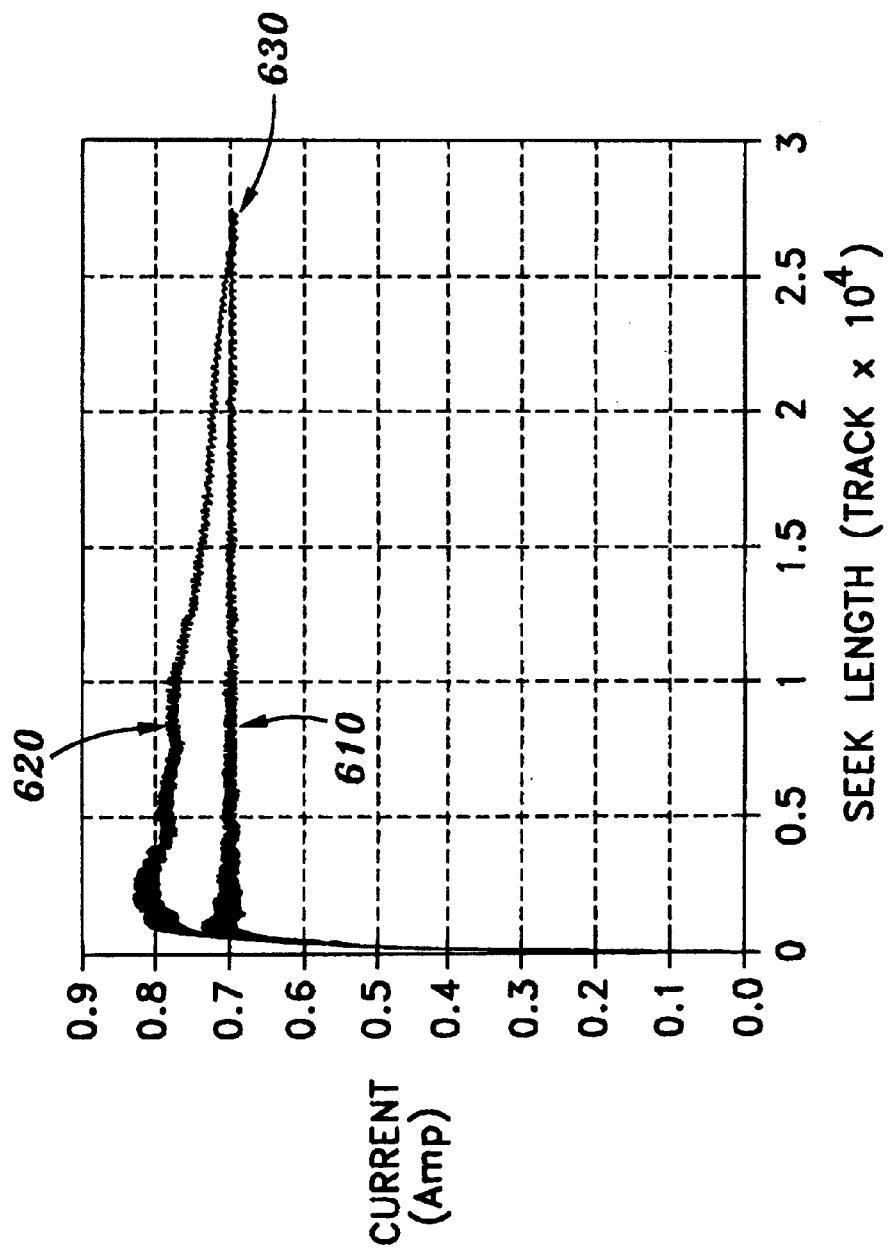
FIG. 6 is a graph comparing a plot of the required current to achieve the seek time of FIG. 5 versus seek length for a current-constrained seek and a voltage-constrained seek.
Figure 7:
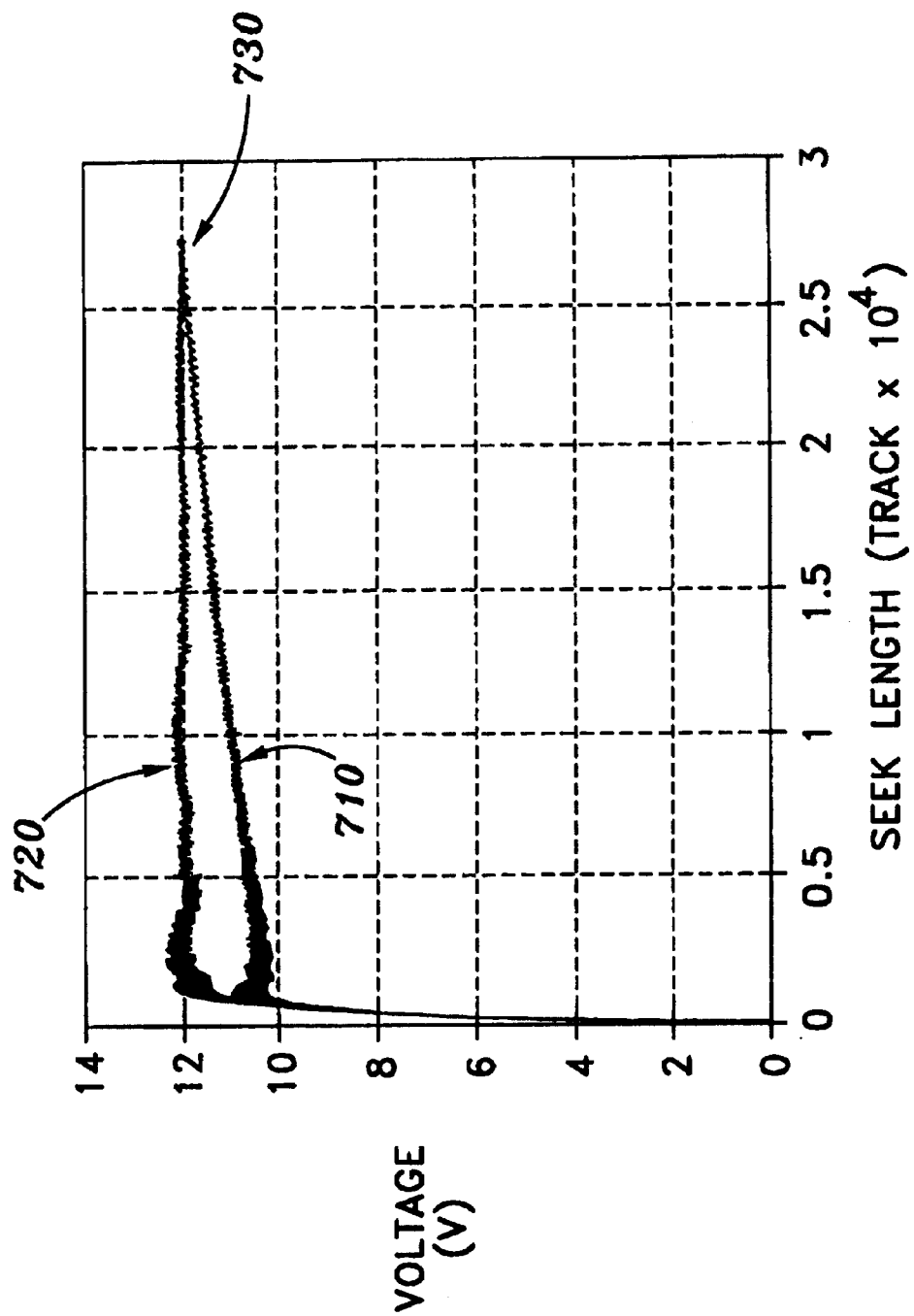
FIG. 7 is a graph comparing a plot of the required voltage to achieve the seek time of FIG. 5 versus seek length for a current-constrained seek and a voltage-constrained seek.

FIGS. 5, 6 and 7 depict various plots for comparing the existing current-constrained seek trajectories against the voltage-constrained trajectories. For illustrative purposes only, values and ranges for current, voltage, seek length ($X_{SK}$), and seek time ($T_{SK}$) are shown. It should also be noted that other values and ranges may be used for the plots of FIGS. 5–7.

Referring now to FIG. 5, curve 510 corresponds to a plot of seek time ($T_{SK}$) versus seek length ($X_{SK}$) for the current-constrained equation (5). Curve 520 corresponds to a plot of seek time ($T_{SK}$) versus seek length ($X_{SK}$) for the voltage-constrained equation (11), according to one embodiment. FIG. 5 illustrates the fact that for seeks below the reference point 530, equation (11) is superior to equation (5) in that seek times are lower for a given seek length. In the current embodiment, the reference point is approximately $2.75*10^4$ tracks.

Under the theory of Ohm's Law, the amount of current flowing in a circuit made up of pure resistances is directly proportional to the electromotive forces impressed on the circuit. While this is not a pure expression of the relationship between current and voltage in a VCM due to the effects of inductance and back-emf, it remains true that the use of a higher voltage enables there to be a higher current for short seek lengths as seen in FIGS. 6 and 7. Moreover, the effects of back-EMF and the proportionality relationship between voltage and current results in a decreasing current curve for a voltage-constrained trajectory and an increasing voltage curve for a current-constrained trajectory.

With the above-described relationship between current and voltage in mind, FIGS. 6 and 7 illustrate how a current-constrained trajectory leads to using a maximum current ($I_M$) that is too conservative for most seeks which are less than the maximum seek length. In particular, in a current-constrained system, current is based, not on the maximum available current, but rather on the maximum voltage available at the maximum seek length. This implies that, for seek lengths below the maximum, the full power supply is not being used.

Referring now to FIG. 6, a plot of maximum current versus seek length is given, where the maximum current corresponds to the needed current to achieve the seek performances of FIG. 5 as a function of seek length. Curve 610 corresponds to the maximum current required to achieve the seek times of FIG. 5 where the maximum current is kept constant over all seek lengths. In this embodiment, $I_M$ is approximately 0.70 amps. Similarly, curve 620 corresponds to the maximum current required to achieve the seek times of FIG. 5 where voltage is kept constant, according to one embodiment.

Referring now to FIG. 7, a plot of voltage versus seek length is given, where the voltage corresponds to the maximum voltage needed to achieve the seek performances of FIG. 5 as a function of seek length. Curve 710 corresponds to the maximum voltage required to achieve the seek times of FIG. 5 where the maximum current is kept constant. Similarly, curve 720 corresponds to the maximum voltage required to achieve the seek times of FIG. 5 where the maximum voltage is kept constant over all seek lengths. In this embodiment, the maximum voltage is maintained at a value of approximately 12 volts.

In the constant-current voltage curve 710, the supplied voltage is required to increase as seek length increases to counteract the effects of back-EMF. Since current (curve 610) remains relatively constant, so too must the effective voltage (not shown) in order to maintain proportionality. However, since the effective voltage is being reduced by back-EMF with increasing seek length, the supplied voltage (curve 710) must be increased to compensate for this effect, and thus to keep effective voltage proportional to current. This increase in supplied voltage may continue until the maximum available voltage supply is reached at point 730. Once point 730 is known, $I_M$ may be determined such that the real physical constraint of the system (i.e., voltage) is not exceeded for the desired maximum seek length. This has the effect of producing a overly conservative estimate of current for seek lengths below the maximum.

In the constant-voltage current curve 620 of FIG. 6, current must be correspondingly decreased to maintain proportionality with the decreasing effective voltage. In this case, while the supplied voltage remains constant, the effective voltage (not shown) is decreasing due to back-EMF effects. Thus, under the theory of Ohm's Law, current must also decrease (curve 620). However, with the voltage-constrained system the true physical constraint of the system (i.e. voltage) is maximized for all seek lengths, while current decreases in response to the actual effects of back-emf.

During the servo routine, the system may take a number of samples which correlate to the different positions, velocities and accelerations of the transducer as it moves from one track to another. It is desirebale to discretize the design trajectories to correspond with the sampling of Gray codes so that the actual values can be subtracted from the design values at the summing junctions of the servo sector shown in FIG. 3. In one embodiment, to discretize the trajectories, equations (1), (2) and (3) are transformed into a sample domain (n) and equation (4) is substituted into the amplitude terms to generate the following equations:

$$a(n) = \frac{2\pi X_{SK}}{N_{SK}^2 T_{SM}^2} \sin\left(\frac{2\pi}{N_{SK}} n\right) \quad (13)$$

$$v(n) = \frac{X_{SK}}{N_{SK} T_{SM}} \left[1 - \cos\left(\frac{2\pi}{N_{SK}} n\right)\right], \quad (14)$$

$$x(n) = \frac{X_{SK}}{N_{SK}} n - \frac{X_{SK}}{2\pi} \sin\left(\frac{2\pi}{N_{SK}} n\right) \quad (15)$$

where;

$T_{sm}$=the sampling time, computed from equation (11);
$N_{SK}$=the total number of samples;
n=sample number.

The sine and cosine values can be computed by utilizing look-up tables that are stored in memory. Alternatively, the sine and cosine values can be computed with the state equation and initial value of the following recursive sine wave generation algorithm:

$$\begin{bmatrix} x_c(n+1) \\ x_s(n+1) \end{bmatrix} = \begin{bmatrix} \cos\left(\frac{2\pi}{N_{SK}}\right) & -\sin\left(\frac{2\pi}{N_{SK}}\right) \\ \sin\left(\frac{2\pi}{N_{SK}}\right) & \cos\left(\frac{2\pi}{N_{SK}}\right) \end{bmatrix} \begin{bmatrix} x_c(n) \\ x_s(n) \end{bmatrix}, \begin{bmatrix} x_c(0) \\ x_s(0) \end{bmatrix} = \begin{bmatrix} M \\ 0 \end{bmatrix}, \quad (16)$$

which utilizes the following known trigonometric identities:

$$\cos\left(\frac{2\pi}{N_{SK}}(n+1)\right) = \cos\left(\frac{2\pi}{N_{SK}}\right)\cos\left(\frac{2\pi}{N_{SK}} n\right) - \sin\left(\frac{2\pi}{N_{SK}}\right)\sin\left(\frac{2\pi}{N_{SK}} n\right) \quad (17)$$

$$\sin\left(\frac{2\pi}{N_{SK}}(n+1)\right) = \sin\left(\frac{2\pi}{N_{SK}}\right)\cos\left(\frac{2\pi}{N_{SK}} n\right) - \cos\left(\frac{2\pi}{N_{SK}}\right)\sin\left(\frac{2\pi}{N_{SK}} n\right). \quad (18)$$

During the servo routine the controller computes the design position, design velocity and design acceleration of the transducer at a first sample time, determines the actual position, velocity and acceleration values and then processes the data in accordance with the control loop shown in FIG. 3 and described above. Second, third, etc. samples are taken and the process is repeated to provide a servo routine that controls the movement of the transducer.

The velocity of the transducer should not exceed a maximum value so that the transducer can accurately read gray codes from the disk. From equation (2) the maximum velocity can be computed as follows:

$$V_{VEL}^M = K_A I_M \frac{T_{SK}}{\pi} \quad (19)$$

where, $V_{VEL}^M$=Maximum velocity below which Gray codes can still be accurately read Solving equation (4) for $I_M$ and substituting into equation (19) gives:

$$X_{SK}^M = \frac{T_{SK}^M * V_{VEL}^M}{2} \quad (20)$$

where, $X_{SK}^M$=the maximum seek length without a coast period; and $T_{SK}^M$=the maximum seek time without a coast period.

$X_{SK}$ in equation (11) may then be set to $X_{SK}^M$ and replaced accordingly with equation (20). Next, $T_{SK}$ is set to $T_{SK}^M$. This leaves equation (11) in the following form:

$$K_e \frac{V_{VEL}^M}{2} + \sqrt{\left(\frac{\pi R V_{VEL}^M}{K_A}\right)^2 + \left(\frac{2\pi^2 L V_{VEL}^M}{K_A T_{SK}^M} - \frac{K_e V_{VEL}^M}{2}\right)^2} - V_{\max} = 0 \quad (21)$$

After substituting all of the known constants into equation (21) and solving for $T_{SK}^M$, equation (20) may then be solved for $X_{SK}^M$. When the seek length $X_{SK}$ exceeds the maximum seek length $X_{SK}^M$, a coast period must be introduced where the acceleration of the transducer is zero, so that the transducer velocity does not exceed the maximum value. The coast time can be defined by the following equation.

$$T_{CST} = \frac{X_{SK} - X_{SK}^M}{V_{VEL}^M} \quad (22)$$

where, $T_{CST}$=coast time

For a seek length greater than $X_{SK}^M$ the design position, design velocity and design acceleration trajectories may be defined in (n) domain by the following equations.

$$a(n) = \frac{2\pi 2 X_{ACC}}{N_{SK}^{M2} T_{SM}^2} \sin\left(\frac{2\pi}{N_{SK}^M} n\right) \quad (23)$$

$$v(n) = \frac{2 X_{ACC}}{N_{SK}^M T_{SM}} \left[1 - \cos\left(\frac{2\pi}{N_{SK}^M} n\right)\right] \quad (24)$$

$$x(n) = \frac{2 X_{ACC}}{N_{SK}^M} n - \frac{2 X_{ACC}}{2\pi} \sin\left(\frac{2\pi}{N_{SK}^M} n\right) \quad (25)$$

when the transducer is accelerating;

$$a(n) = 0 \quad (26)$$

$$V(n) = V_{VEL}^M \quad (27)$$

$$x(n) = X_{ACC} + V_{VEL}^M T_{SM}(n - N_{SK}^M/2) \quad (28)$$

when the transducer is coasting;

$$a(n) = \frac{2\pi 2 X_{DEC}}{N_{SK}^{M2} T_{SM}^2} \sin\left(\frac{2\pi}{N_{SK}^M}(n - N_{CST})\right) \quad (29)$$

$$v(n) = \frac{2 X_{DEC}}{N_{SK}^M T_{SM}} \left[1 - \cos\left(\frac{2\pi}{N_{SK}^M}(n - N_{CST})\right)\right] \quad (30)$$

$$x(n) = X_{ACC} + X_{CST} + \frac{2 X_{DEC}}{N_{SK}^M}(n - N_{CST} - N_{SK}^M/2) - \frac{2 X_{DEC}}{2\pi} \sin\left(\frac{2\pi}{N_{SK}^M}(n - N_{CST})\right) \quad (31)$$

when the transducer is decelerating
where;

$X_{CST} = T_{CST} V_{VEL}^M$ for $T_{CST}$ at coast phase, (32)

$X_{ACC} = (X_{SK} - X_{CST})/2$ for $T_{SK}^M/2$ at acceleration phase, (33)

$X_{DEC} = X_{SK} - X_{ACC} - X_{CST}$ for $T_{SK}^M/2$ at deceleration phase. (34)

When the seek length exceeds $X_{SK}^M$ the controller computes the design position, design velocity and design acceleration in accordance with equations (22) through (34), and then utilizes the design values in the control loop of FIG. 3.

The present invention provides a seek routine wherein the transducer is moved in an essentially sinusoidal acceleration trajectory and a servo control loop that corrects the input current so that the transducer moves in a desired path.

While certain exemplary embodiments have been described and shown in the accompanying drawings, it is to be understood that such embodiments are merely illustrative of and not restrictive on the broad invention, and that this invention not be limited to the specific constructions and arrangements shown and described since various other modifications may occur to those skilled in the art.

What is claimed is:

1. A hard disk drive, comprising:
   a disk which has a surface;
   a spin motor to rotate said disk;
   a transducer which can write information onto said disk and read information from said disk;
   a voice coil motor to move said transducer;
   a controller to control said voice coil motor, said controller to perform a seek routine having a seek length, said transducer to move across the disk surface with an essentially sinusoidal acceleration trajectory, said seek routine to be performed using a substantially constant voltage applied to said voice coil motor over one or more seek lengths and in accordance with an algorithm that is independent of a supply current for said voice coil motor.

2. The hard disk drive of claim 1 wherein, said controller is a digital signal processor.

3. The hard disk drive of claim 2, wherein said digital signal processor controls said voice coil motor in accordance with a linear interpolation algorithm.

4. The hard disk drive of claim 1, wherein said substantially constant voltage is based on a maximum voltage from a power supply.

5. The hard disk drive of claim 4, wherein a current to move said transducer decreases as the seek length increases.

6. The hard disk drive of claim 1, wherein said controller performs a servo routine that determines an actual position of said transducer, computes a design position of said transducer, and generates a position correction value that is a function of said actual and design positions, said position correction value being used to vary the movement of said transducer.

7. The hard disk drive of claim 6, wherein said servo routine further includes determining an actual velocity of said transducer, computing a design velocity of said transducer, and generating a velocity correction value that is a function of said position correction value, said design velocity and said actual velocity, said velocity correction value being used to vary the movement of said transducer.

8. The hard disk drive of claim 7, wherein said servo routine further includes determining an actual acceleration of said transducer, computing a design acceleration of said transducer, and generating an acceleration correction value that is a function of said velocity correction value, said design acceleration and said actual acceleration, said acceleration correction value being used to vary the movement of said transducer.

9. The hard disk of claim 1, wherein the trajectory includes a period wherein said transducer has an essentially zero acceleration.

10. The hard disk of claim 1, wherein the relationship between the seek length and seek time is represented as, $$K_e \frac{X_{SK}}{T_{SK}} + \sqrt{\left(\frac{2\pi R X_{SK}}{K_A T_{SK}}\right)^2 + \left(\frac{4\pi^2 L X_{SK}}{K_A T_{SK}^2} - \frac{K_e X_{SK}}{T_{SK}}\right)^2} - V_{\max} = 0,$$

where;
$K_e$ = back-EMF constant;
$X_{SK}$ = seek length;
$T_{SK}$ = seek time;
R = voice coil motor resistance;
$K_A$ = acceleration constant;
L = voice coil motor inductance;
$V_m$ = constant voltage.

11. A method for moving a transducer across a surface of a disk, comprising:
   exciting a voice coil motor that is coupled to the transducer so that the transducer performs a seek routine having a seek length and a seek time, said transducer to move across the disk surface with an essentially sinusoidal acceleration trajectory, said seek routine to be performed using a substantially constant voltage applied to said voice coil motor over one or more seek lengths and in accordance with an algorithm that is independent of a supply current for said voice coil motor.

12. The method of claim 11, further comprising exciting a voice coil motor that is coupled to the transducer so that the transducer performs the seek routine using a current applied to the voice coil motor where said current varies with the seek length.

13. The method of claim 11, wherein exciting the voice coil motor that is coupled to the transducer so that the transducer performs the seek routine comprises, exciting the voice coil motor so that the transducer performs the seek routine having a seek length and a seek time, where seek length and seek time are related as follows:

$$K_e \frac{X_{SK}}{T_{SK}} + \sqrt{\left(\frac{2\pi R X_{SK}}{K_A T_{SK}}\right)^2 + \left(\frac{4\pi^2 L X_{SK}}{K_A T_{SK}^2} - \frac{K_e X_{SK}}{T_{SK}}\right)^2} - V_{\max} = 0,$$

where;
$K_e$ = back-EMF constant;
$X_{SK}$ seek length;
$T_{SK}$ = seek time;
R = voice coil motor resistance;
$K_A$ = acceleration constant;
L = voice coil motor inductance;
$V_m$ = constant voltage.

14. The method of claim 11, further comprising:
   computing a design position of the transducer;
   determining an actual position of the transducer;
   computing a position correction value from the design and actual positions;
   varying the movement of the transducer with the position correction value;
   determining an actual velocity of said transducer;
   computing a design velocity of said transducer; and,
   generating a velocity correction value that is a function of said position correction value, said design velocity and said actual velocity, said velocity correction value being used to vary the movement of said transducer and being in accordance with an algorithm that is independent of a supply current for said voice coil motor.

15. The method of claim 14, further comprising determining an actual acceleration of said transducer, computing a design acceleration of said transducer, and generating an acceleration correction value that is a function of said velocity correction value, said design acceleration and said actual acceleration, said acceleration correction value being used to vary the movement of said transducer.

16. The method of claim 14, wherein computing the position correction value from the design and actual positions comprises, computing the position correction value with a proportional plus integral control algorithm.

17. The method of claim 11, wherein exciting the voice coil motor that is coupled to the transducer comprises, exciting a voice coil motor that is coupled to the transducer, said transducer to move across the disk surface with an essentially sinusoidal acceleration trajectory, said essentially sinusoidal acceleration trajectory to have an acceleration period and a deceleration period, wherein the acceleration period is unequal to the deceleration period.

18. A method for moving a transducer across a surface of a disk, comprising:
   moving a transducer across the surface of the disk a distance in accordance with an essentially sinusoidal acceleration trajectory using a substantially constant voltage and a varying current and in accordance with an algorithm that is independent of a supply current for said voice coil motor, where said current decreases as the distance increases.

19. A computer program product, comprising:
   a computer usable medium having computer program code embodied therein to move an actuator arm that is coupled to a transducer using a voice coil motor so that the transducer moves across a disk surface in accordance with an essentially sinusoidal acceleration trajectory using an essentially constant voltage applied to the voice coil motor and in accordance with an algorithm that is independent of a supply current for said voice coil motor.

20. The computer program product of claim 19, further comprising computer readable code to computer a design position of the transducer, determine an actual position of the transducer, and compute a position correction value from the design and actual positions.

21. The computer program product of claim 20, further comprising computer readable code to compute a design velocity of the transducer, determine an actual velocity of the transducer, compute a velocity correction value from the design velocity, the actual velocity and the position correction value, compute a design acceleration of the transducer, determine an actual acceleration of the transducer, compute an acceleration correction value from the design acceleration, the actual acceleration and the velocity correction value, and vary the movement of the transducer with at least one correction value selected from the group consisting of: the position correction value, the velocity correction value, and the acceleration correction value.

22. The computer program product of claim 21, wherein the design acceleration, the design velocity and the design position are computed with a recursive sine wave generation algorithm.

23. The computer program product of claim 19, wherein the computer readable program code to excite said actuator arm further comprises computer readable program code to determine a seek length and a seek time according to said sinusoidal acceleration trajectory, wherein the relationship between seek length and seek time is, $$K_e \frac{X_{SK}}{T_{SK}} + \sqrt{\left(\frac{2\pi R X_{SK}}{K_A T_{SK}}\right)^2 + \left(\frac{4\pi^2 L X_{SK}}{K_A T_{SK}^2} - \frac{K_e X_{SK}}{T_{SK}}\right)^2} - V_{max} = 0,$$

where;
$K_e$=back-EMF constant;
$X_{SK}$=seek length;
$T_{SK}$=seek time;
R=voice coil motor resistance;
$K_A$=acceleration constant;
L=voice coil motor inductance;
$V_m$=constant voltage.

24. An apparatus for moving a transducer across a surface of a disk, comprising:
   means for exciting a voice coil motor that is coupled to the transducer, said transducer to perform a seek routine having a seek length and a seek time;
   means for moving said transducer across the disk surface based on a seek routine having an essentially sinusoidal acceleration trajectory; and,
   means for performing said seek routine using a substantially constant voltage applied to said voice coil motor over one or more seek lengths and in accordance with an algorithm that is independent of a supply current for said voice coil motor.

25. The apparatus of claim 24, wherein means for using the substantially constant voltage applied to said voice coil motor comprises means for using the substantially constant voltage applied to said voice coil motor that is in the range of between 10 and 12 volts.

26. The apparatus of claim 24, further comprising means for exciting a voice coil motor that is coupled to the transducer, said transducer to perform the seek routine using a current applied to the voice coil motor where said current varies with the seek length.

27. The apparatus of claim 24, further comprising:
   means for exciting the voice coil motor so that the transducer performs the seek routine having a seek length and a seek time, where seek length and seek time are related as follows:

$$K_e \frac{X_{SK}}{T_{SK}} + \sqrt{\left(\frac{2\pi R X_{SK}}{K_A T_{SK}}\right)^2 + \left(\frac{4\pi^2 L X_{SK}}{K_A T_{SK}^2} - \frac{K_e X_{SK}}{T_{SK}}\right)^2} - V_{max} = 0,$$

where;
$K_e$=back-EMF constant;
$X_{SK}$=seek length;
$T_{SK}$=seek time;
R=voice coil motor resistance;
$K_A$=acceleration constant;
L=voice coil motor inductance;
$V_m$=constant voltage.

28. The apparatus of claim 24, further comprising:
   means for computing a design position of the transducer;
   means for determining an actual position of the transducer;
   means for computing a position correction value from the design and actual positions;
   means for varying the movement of the transducer with the position correction value;
   means for determining an actual velocity of said transducer;

means for computing a design velocity of said transducer; and, means for generating a velocity correction value that is a function of said position correction value, said design velocity and said actual velocity, said velocity correction value being used to vary the movement of said transducer.

29. The apparatus of claim 28, further comprising:

means for determining an actual acceleration of said transducer;

means for computing a design acceleration of said transducer; and, means for generating an acceleration correction value that is a function of said velocity correction value, said design acceleration and said actual acceleration, said acceleration correction value being used to vary the movement of said transducer.

30. The apparatus of claim 28, wherein said means for computing the position correction value from the design and actual positions comprises, means for computing the position correction value with a proportional plus integral control algorithm.

31. The apparatus of claim 24, wherein said means for exciting the voice coil motor that is coupled to the transducer comprises, means for exciting a voice coil motor that is coupled to the transducer, said transducer to move across the disk surface with an essentially sinusoidal acceleration trajectory, said essentially sinusoidal acceleration trajectory to have an acceleration period and a deceleration period, wherein the acceleration period is unequal to the deceleration period.

* * * * *